US00RE38699E

(19) United States
(12) Reissued Patent
Laverick et al.

(10) Patent Number: US RE38,699 E
(45) Date of Reissued Patent: Feb. 15, 2005

(54) HAND-HELD NAVIGATIONAL DEVICE

(75) Inventors: David J. Laverick, Overland Park, KS (US); Jonathan C. Burrell, Olathe, KS (US); Gary L. Burrell, Olathe, KS (US)

(73) Assignee: Garmin Corporation (TW)

(21) Appl. No.: 29/083,978

(22) Filed: Dec. 12, 1997

Related U.S. Patent Documents

Reissue of:
(64) Patent No.: Des. 365,032
Issued: Dec. 12, 1995
Appl. No.: 29/028,884
Filed: Sep. 23, 1994

(51) LOC (6) Cl. ..... 10-04
(52) U.S. Cl. ..... D10/78; D10/65
(58) Field of Search ..... D10/65, 78; 73/178 R; 340/965; 342/98, 100, 113, 115, 352, 256, 357, 359, 417, 421; 364/200, 434, 443, 444, 449, 451, 708.1, 709.11

(56) References Cited

U.S. PATENT DOCUMENTS

D291,288 S * 8/1987 Suzuki ..... D10/78
D314,713 S * 2/1991 Ciranny et al. ..... D10/65

OTHER PUBLICATIONS

Manufacturer's showcase, Garmin GPS–50 Personal Navigator, ® 1992, p. 128.*

* cited by examiner

*Primary Examiner*—Antoine Duval Davis
(74) *Attorney, Agent, or Firm*—Devon A. Rolf

(57) CLAIM

The ornamental design for a hand-held nagivational device, as shown and described.

DESCRIPTION

*FIG. 8 is a perspective view of a hand-held navigational device according to the present invention;*

*FIG. 9 is a front elevational view thereof;*

*FIG. 10 is a left side elevational view thereof, with the right side being a mere image of the left side;*

*FIG. 11 is a top plan view thereof; and,*

*FIG. 12 is a bottom plan view thereof.*

1 Claim, 3 Drawing Sheets

Figure 3:
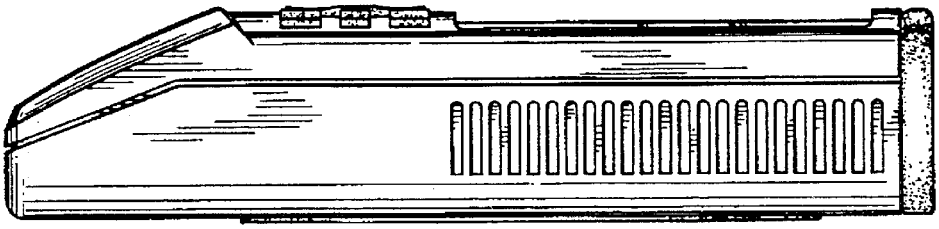
FIG. 3 is a left side elevation view thereof.
Figure 2:
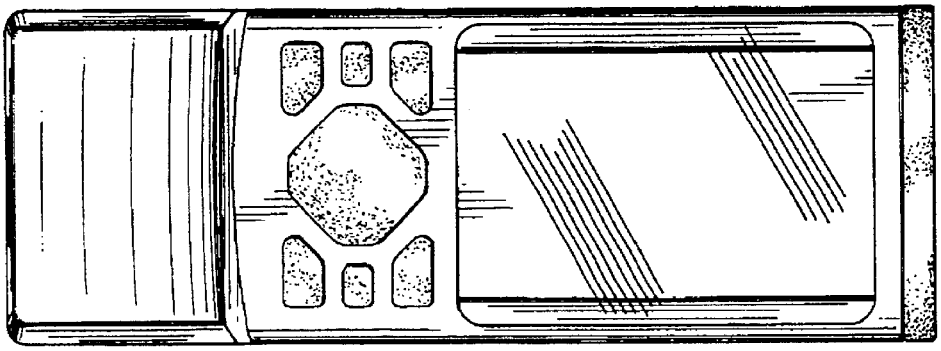
FIG. 2 is a front elevation view thereof.
Figure 1:
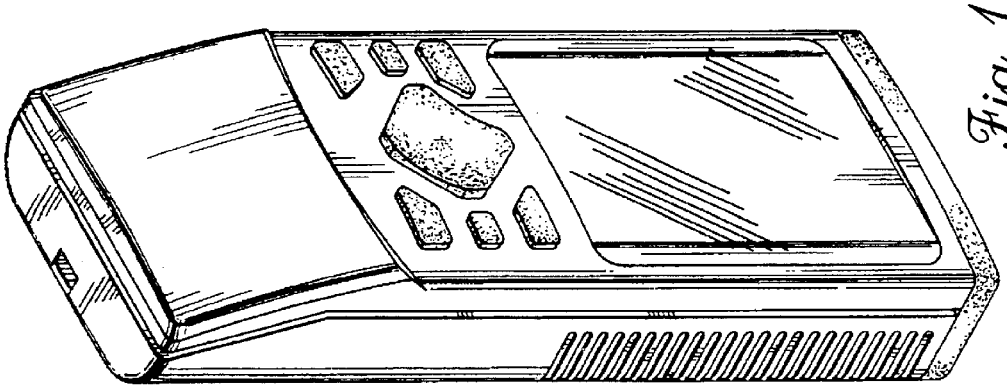
FIG. 1 is a perspective view of a hand-held navigational device according to the present invention.
Figure 4:
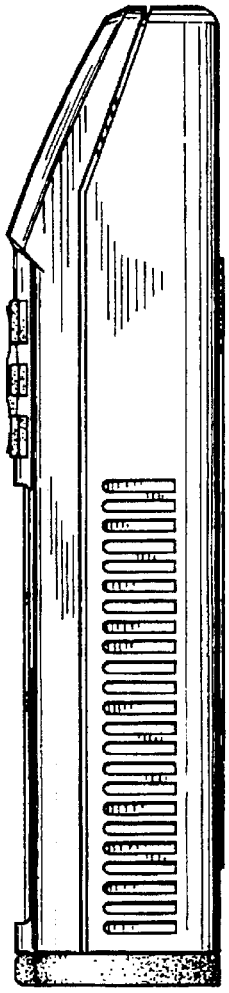
FIG. 4 is a right side elevation view thereof.
Figure 5:
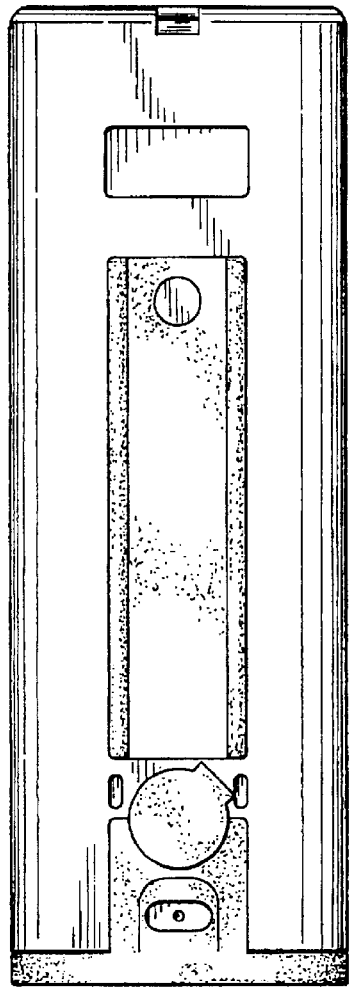
FIG. 5 is a rear elevation view thereof.
Figure 6:
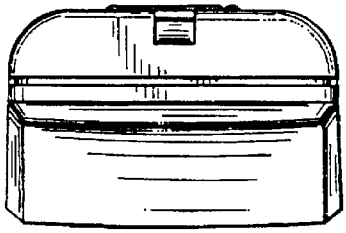
FIG. 6 is a top plan view thereof; [and]
Figure 7:
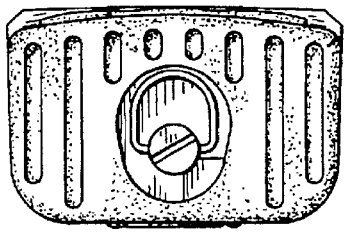
FIG. 7 is a bottom plan view thereof.

Matter enclosed in heavy brackets [ ] appears in the original patent, but forms no part of this reissue; matter printed in italics indicates the additions made by reissue.

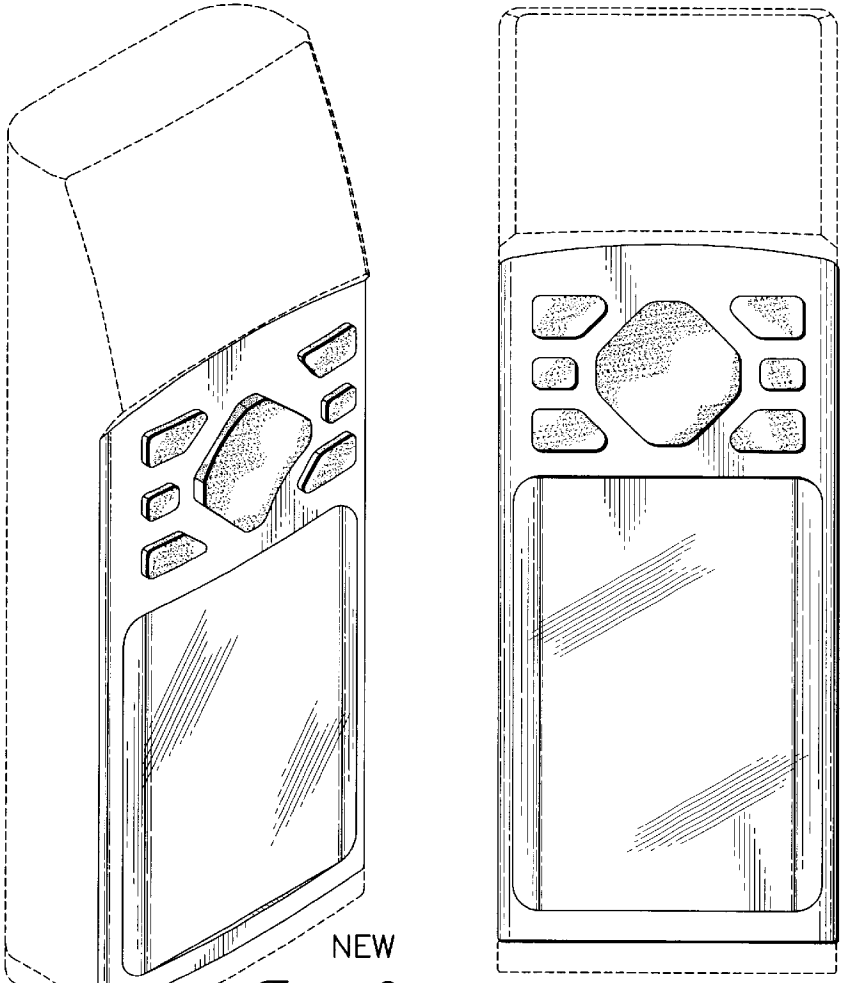
Fig. 8.
Fig. 9.
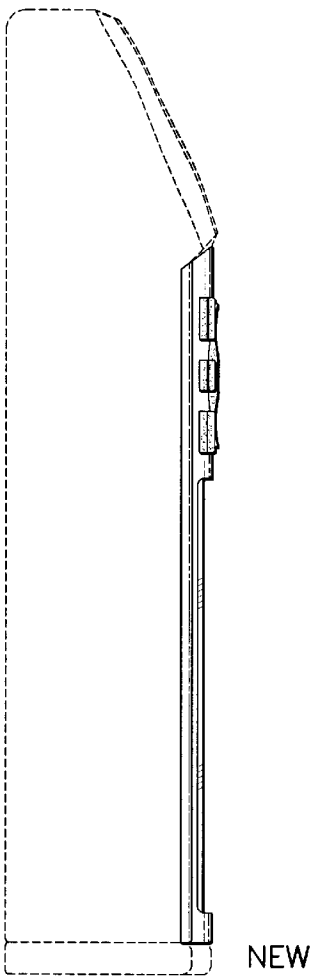
Fig. 10.
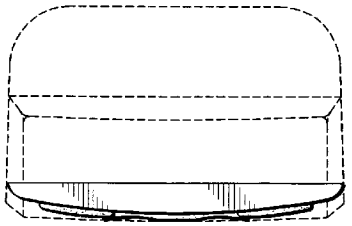
Fig. 11.
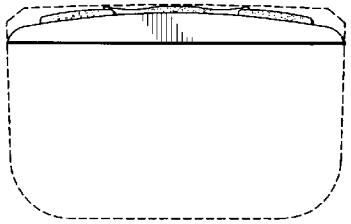
Fig. 12.